United States Patent
Miyaji et al.

(10) Patent No.: US 7,614,289 B2
(45) Date of Patent: Nov. 10, 2009

(54) CONTROL APPARATUS FOR AN INTERNAL COMBUSTION ENGINE WHICH DETECTS KNOCKING OF THE ENGINE

(75) Inventors: Hidetoshi Miyaji, Tokyo (JP); Hiroyuki Kobayashi, Kobe (JP); Akira Furuta, Tokyo (JP); Manabu Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 11/875,483

(22) Filed: Oct. 19, 2007

(65) Prior Publication Data

US 2008/0257025 A1    Oct. 23, 2008

(30) Foreign Application Priority Data

Apr. 17, 2007   (JP)   ............... 2007-108231

(51) Int. Cl.
*G01M 15/04*   (2006.01)
(52) U.S. Cl. .................................................. 73/114.07
(58) Field of Classification Search .............. 73/35.01, 73/35.07, 35.09, 114.07
See application file for complete search history.

(56) References Cited

U.S. PATENT DOCUMENTS

| | | | |
|---|---|---|---|
| 5,408,863 A * | 4/1995 | Sawyers et al. | 73/35.05 |
| 5,645,753 A * | 7/1997 | Fukuoka et al. | 252/62.9 PZ |
| 5,719,326 A * | 2/1998 | Vulih et al. | 73/35.07 |
| 5,736,896 A * | 4/1998 | Sakishita et al. | 327/554 |
| 6,289,720 B1 * | 9/2001 | Ohkubo et al. | 73/35.01 |
| 6,867,691 B2 * | 3/2005 | Nishimura | 340/439 |
| 6,947,829 B2 * | 9/2005 | Honda | 701/111 |
| 7,051,711 B2 * | 5/2006 | Sauler et al. | 123/406.29 |
| 7,243,529 B2 * | 7/2007 | Takemura et al. | 73/35.09 |
| 7,347,081 B2 * | 3/2008 | Inoue et al. | 73/35.09 |
| 2003/0005749 A1 * | 1/2003 | Nishimura | 73/35.01 |
| 2006/0117834 A1 * | 6/2006 | Goto | 73/35.09 |

FOREIGN PATENT DOCUMENTS

| | | |
|---|---|---|
| JP | 56-637 A | 1/1981 |
| JP | 5-306645 A | 11/1993 |
| JP | 07-139415 A | 5/1995 |
| JP | 08-326594 A | 12/1996 |
| JP | 2002-030982 | 1/2002 |
| JP | 3341391 B2 | 8/2002 |

* cited by examiner

*Primary Examiner*—Lisa M Caputo
*Assistant Examiner*—Freddie Kirkland, III
(74) *Attorney, Agent, or Firm*—Sughrue Mion, PLLC

(57) ABSTRACT

A control apparatus for an internal combustion engine can detect knocking of the engine even when an extraction frequency band is switched in accordance with an operating state of the engine. The apparatus includes a knock sensor for detecting vibrations generated in the engine and outputting a vibration detection signal, a rotation sensor for detecting the engine operating state, a SCF circuit for extracting a signal of a specific frequency band from the vibration detection signal and outputting an extracted vibration signal, a filter frequency switching section for switching an extraction frequency band of the filter section in accordance with the engine operating state, and a knocking detection section for detecting knocking of the engine based on the extracted vibration signal. The filter frequency switching section inhibits switching of the extraction frequency band until a switching inhibition period elapses after the switching of the extraction frequency band.

5 Claims, 11 Drawing Sheets

CONTROL APPARATUS FOR AN INTERNAL COMBUSTION ENGINE WHICH DETECTS KNOCKING OF THE ENGINE

BACKGROUND OF THE INVENTION

1. Field of the Invention

The present invention relates to a control apparatus for an internal combustion engine that serves to detect the presence or absence of knocking of the internal combustion engine (e.g., automotive gasoline engine, etc.).

2. Description of the Related Art

A typical known knocking detection apparatus for an internal combustion engine includes a knock sensor that detects vibrations generated in the internal combustion engine, a filter circuit that is connected to the knock sensor, and has a plurality of filters for extracting signals of different frequency bands, respectively, and a filter control circuit that selects one of outputs of the individual filters in accordance with the operating state of the internal combustion engine and outputs the thus selected one from the filter circuit (see, for example, a first patent document: Japanese patent application laid-open S56-637).

This knocking detection apparatus detects the presence or absence of knocking of the internal combustion engine based on the signal level of the output signal from the filter circuit.

In general, when the operating state of the internal combustion engine (e.g., the internal combustion engine is in a state of high speed operation or in a state of low speed operation or the like) changes, the signal level of noise and knocking contained in a signal of a frequency band extracted by a filter changes. That is, when the engine operating state changes, the frequency band suitable for detection of knocking changes.

Accordingly, provision is made for a filter circuit that has a plurality of filters for extracting signals of mutually different frequency bands, respectively, so as to make the detectability of knocking in the individual operating states optimal, whereby the presence or absence of knocking of the internal combustion engine can be detected with a high degree of precision by selecting one of the outputs from the individual filters in accordance with the engine operating state.

However, in case where the filter circuit is provided with the plurality of filters, there is the following problem. That is, it is necessary to provide filter component elements corresponding in number to the filters and to set a multitude of resistance values and the capacitors' capacitance values in accordance with the characteristics of the filters.

Accordingly, in order to solve the above-mentioned problem, a known knocking detection apparatus for an internal combustion engine includes a knock sensor that detects vibrations generated in the internal combustion engine, a switched-capacitor filter that extracts a signal of a frequency band peculiar to knocking from an output signal of the knock sensor, and a filter control circuit that switches an extraction frequency band of the switched-capacitor filter by adjusting a switching drive frequency supplied to the switched-capacitor filter in accordance with the operating state of the internal combustion engine (see, for instance, a second patent document: Japanese patent application laid-open H5-306645).

However, when one output from among the individual filters is selected in accordance with the engine operating state, or when the extraction frequency band of the switched-capacitor filter is switched over in accordance with the engine operating state, there is generated a large variation in the output signals from the filters or in the output signal from the switched-capacitor filter resulting from the switching of the frequency band.

Thus, for example, in case where the output signals from the filters are subjected to averaging processing for predetermined ignition cycles and then multiplied by a predetermined value, and the value thus obtained is set as a determination level for detection of the presence or absence of knocking, a considerable time is required until the time this determination level reaches a level with which the presence or absence of knocking can be normally detected after the extraction frequency band is switched over.

Accordingly, there has been a problem that the presence or absence of knocking is unable to be detected normally or correctly for such a period of time.

In order to solve the problems as referred to above, there has been proposed a known knocking detection apparatus for an internal combustion engine which includes a background level calculation section that calculates a background level corresponding to a level change of an output signal form a bandpass filter by averaging the output signal, a determination level setting section that sets a determination level for detection of the presence or absence of knocking based on the background level, and an update amount increasing section that forcedly increases an update amount for updating the background level or forcedly decreases an anneal number (reflection coefficient) set in the background level calculation section immediately after switching of an extraction frequency band of the bandpass filter (see, for example, a third patent document: Japanese patent No. 3341391).

In general, the output level of the output signal from the filter varies according to individual extraction frequency bands, respectively, so when the extraction frequency band is switched over, some time will be required until the background level becomes stabilized. Accordingly, the detection accuracy of knocking reduces during such a period of time.

Thus, by forcedly increasing the amount of update of the background level, or by forcedly decreasing the number of anneals (average changes of signal level) immediately after the switching of the extraction frequency band, the time required until the background level is stabilized is shortened.

Here, in case of increasing the amount of update of the background level, or decreasing the number of anneals (average changes of signal level), if there is a large difference in the signal level between the output signals before and after the extraction frequency band is switched over, a certain time is required until the background level is stabilized, so there exists a period of time in which the detection accuracy of knocking is low.

In addition, in case of increasing the amount of update of the background level, when the amount of update is set large so as to adjust the background level to an appropriate one immediately, there might occur an excess or deficiency of the amount of update due to variation in the output level of the individual knock sensor thereby to reduce the detection accuracy of knocking since the amount of update is set in absolute voltage terms.

For example, for a knock sensor having an output level of about half of a center characteristic thereof, it is necessary to set the amount of update thereof to ½, whereas for a knock sensor having an output level of about twice of the center characteristic, it is necessary to set the amount of update thereof to 2-fold. Accordingly, it is difficult to set an appropriate amount of update for the variation of the output level of the knock sensor.

In addition, the change of the background level becomes sensitive with respect to a change in the output of the knock sensor, the detection accuracy of knocking might be reduced due to transient response.

Thus, in the known knocking detection apparatuses for an internal combustion engine, there is the following problem. That is, when the extraction frequency band is switched over again after switching of the extraction frequency band during the time until the background level is stabilized, the background level is unstable, and the reduced detection accuracy of knocking continues.

SUMMARY OF THE INVENTION

Accordingly, the present invention is intended to obviate the problems as referred to above, and has for its object to provide a control apparatus for an internal combustion engine which is capable of detecting the presence or absence of knocking of the internal combustion engine with a high degree of precision even when an extraction frequency band of a filter section is switched over in accordance with the operating state of the internal combustion engine.

Bearing the above object in mind, a control apparatus for an internal combustion engine according to the present invention includes: a knock sensor that detects vibrations generated in the internal combustion engine and outputs a vibration detection signal; an operating state detection section that detects an operating state of the internal combustion engine; a filter section that extracts a signal of a specific frequency band from the vibration detection signal and outputs an extracted vibration signal; a filter frequency switching section that switches an extraction frequency band of the filter section in accordance with the engine operating state; and a knocking detection section that detects the presence or absence of knocking of the internal combustion engine based on the extracted vibration signal. The filter frequency switching section inhibits switching of the extraction frequency band over a first predetermined period after the extraction frequency band is switched over.

According to the control apparatus for an internal combustion engine of the present invention, the filter frequency switching section inhibits the switching of the extraction frequency band over a first predetermined period after the extraction frequency band is switched over. Thus, by preventing the extraction frequency band of the filter section from being switched over in succession, it is possible to avoid a situation in which the reduced detection accuracy of knocking after the switching of the extraction frequency band continues.

Accordingly, even when the extraction frequency band of the filter section is switched over in accordance with the operating state of the internal combustion engine, it is possible to detect the presence or absence of knocking of the internal combustion engine with a high degree of precision.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
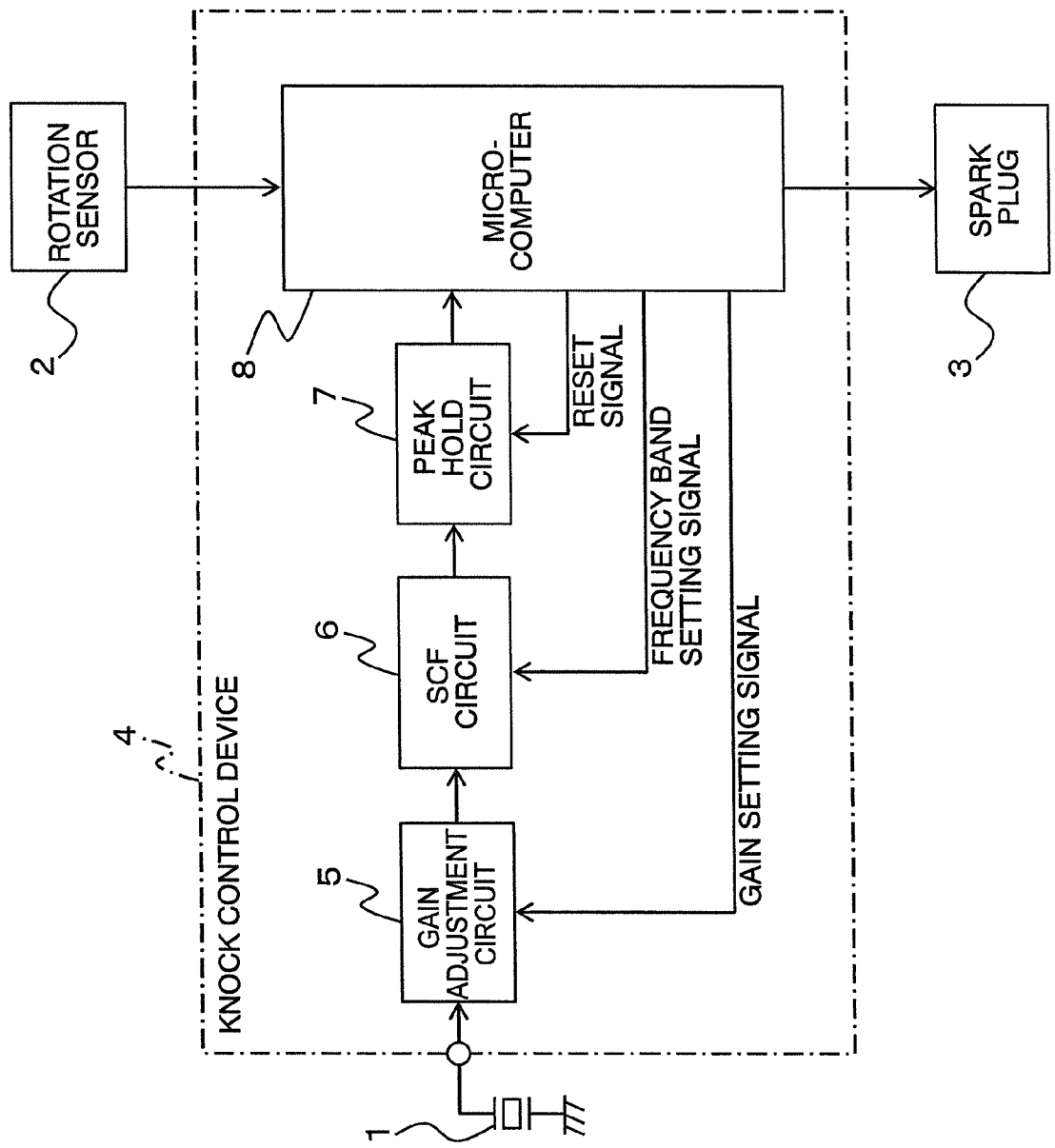
FIG. 1 is a block diagram schematically showing an control apparatus for an internal combustion engine according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Referring to the drawings and first to FIG. 1, there is schematically shown a control apparatus for an internal combustion engine according to a first embodiment of the present invention.

In FIG. 1, the control apparatus for an internal combustion engine is provided with a knock sensor 1, a rotation sensor 2 (an operating state detection section), and a spark plug 3 and a knock control device 4.

The knock sensor 1 is mounted on an unillustrated engine (internal combustion engine) for detecting vibrations generated in the engine to output a vibration detection signal corresponding to the level of vibrations thus detected.

The rotation sensor 2 outputs a pulse signal corresponding to the number of revolutions per minute of the engine.

The spark plug 3 ignites a mixture supplied to a combustion chamber (not shown) of the engine.

The knock control device 4 detects the presence or absence of knocking of the engine based on the vibration detection signal from the knock sensor 1 and the pulse signal from the rotation sensor 2, and outputs an ignition signal to the spark plug 3.

The knock control device 4 has a gain adjustment circuit 5, a switched-capacitor filter circuit 6 (a filter section, hereinafter abbreviated as an "SCF circuit 6"), a peak hold circuit 7 and a microcomputer 8.

The gain adjustment circuit 5 includes an amplifier (not shown) for amplifying the vibration detection signal from the knock sensor 1, and a switching element (not shown) for adjusting the gain of the amplifier. The gain adjustment circuit 5 has the vibration detection signal input hereto from the knock sensor 1, adjusts the signal level thereof, and outputs the vibration detection signal thus adjusted.

The SCF circuit 6 includes a capacitor (not shown) and a switching element (not shown), and serves to achieve a kind of resistor by driving the switching element in an on/off manner, so that it functions as a filter. The SCF circuit 6 has the vibration detection signal input thereto of which the signal level has been adjusted by the gain adjustment circuit 5, extracts, from this vibration detection signal, a signal of a specific frequency band corresponding to knocking, and outputs the thus extracted vibration signal.

The peak hold circuit 7 has the extracted vibration signal input thereto from the SCF circuit 6, holds a peak value of the extracted vibration signal, and outputs the peak hold signal.

Here, a reset signal is output from the microcomputer 8 to the peak hold circuit 7 in synchronization with the ignition signal to the spark plug 3. The peak hold circuit 7 resets the peak value of the extracted vibration signal thus held in accordance with the reset signal. Here, note that the reset signal may be output in synchronization with the pulse signal from the rotation sensor 2.

The microcomputer 8 detects the presence or absence of knocking of the engine based on the peak hold signal from the peak hold circuit 7, and outputs an ignition signal to the spark plug 3.

Figure 2:
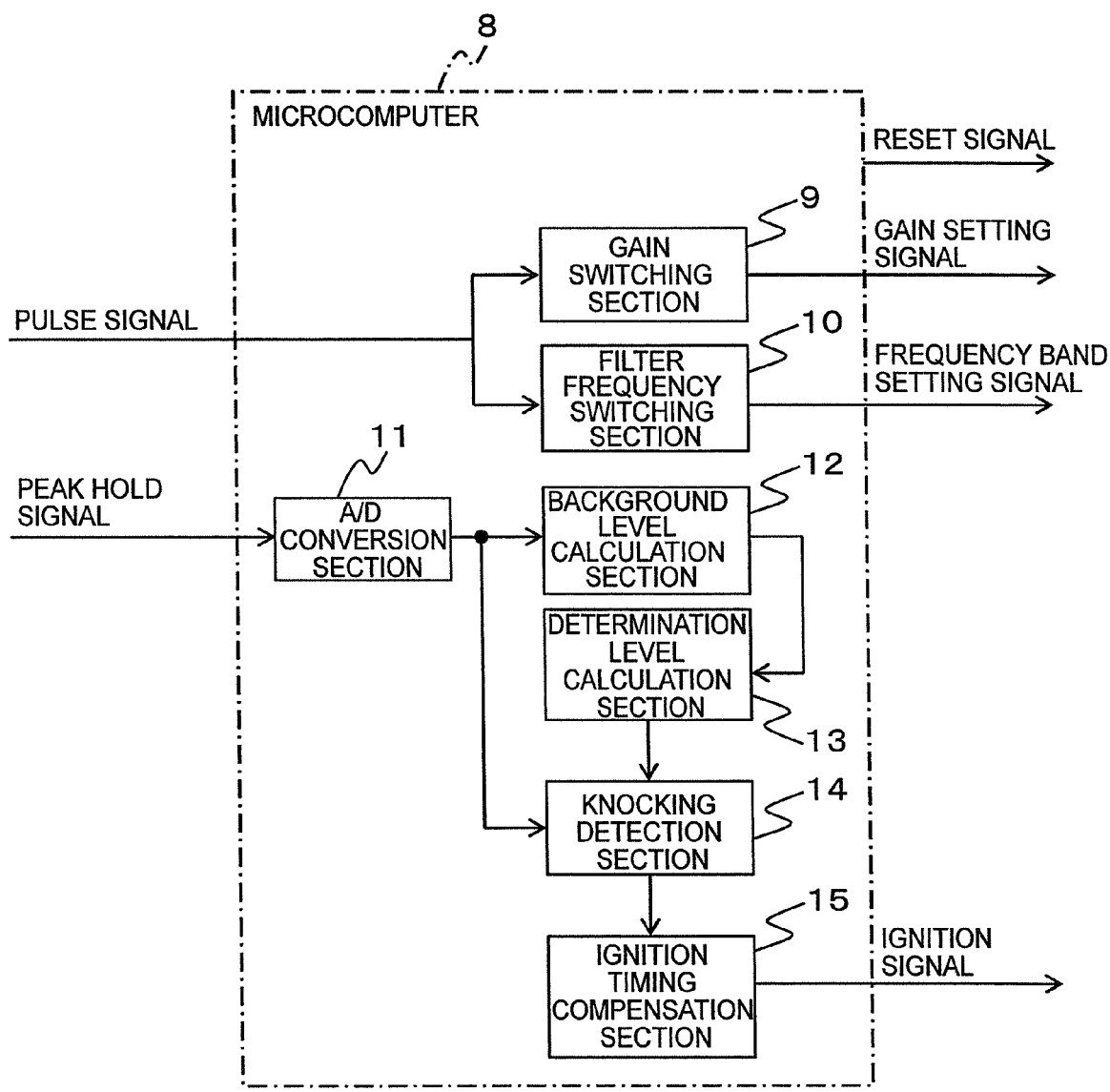
FIG. 2 is a block diagram specifically showing the construction of a microcomputer in FIG. 1.

FIG. 2 is a block diagram that specifically shows the construction of the microcomputer 8 in FIG. 1.

The microcomputer 8 includes a gain switching section 9, a filter frequency switching section 10, an A/D conversion section 11, a background level calculation section 12, a determination level calculation section 13, a knocking detection section 14, and an ignition timing compensation section 15. Also, the microcomputer 8 comprises a CPU and a memory that stores programs, and individual blocks constituting the microcomputer 8 are stored in the memory as software.

The gain switching section 9 outputs a gain setting signal for adjusting the gain of the amplifier of the gain adjustment circuit 5 based on the pulse signal from the rotation sensor 2. The gain setting signal adjusts the gain of the amplifier by changing a drive time of the switching element of the gain adjustment circuit 5.

The filter frequency switching section 10 outputs a frequency band setting signal for switching the frequency band (extraction frequency band) of the signal extracted by the SCF circuit 6 based on the pulse signal from the rotation sensor 2. The frequency band setting signal switches the extraction frequency band of the SCF circuit 6 by changing driving period of the switching element of the SCF circuit 6.

Here, note that the filter frequency switching section 10 inhibits the switching of the extraction frequency band until a switching inhibition period T1 (a first predetermined time) elapses after the switching of the extraction frequency band.

The A/D conversion section 11 converts the peak hold signal from the peak hold circuit 7 from analog into digital form, and outputs the thus A/D converted peak hold signal.

The background level calculation section 12 first reads in the peak hold signal A/D converted by the A/D conversion section 11 at each predetermined timing immediately before the microcomputer 8 outputs a reset signal, and stores a peak value of the peak hold signal as a peak hold value PH.

Subsequently, the background level calculation section 12 calculates the background level BGL by averaging the peak hold value PH thus stored. The background level BGL is represented, for example, by the following expression (1).

$$BGL=(1-k)\times BGL[i-1]+k\times PH \quad (1)$$

where k represents a reflection coefficient of the background level BGL, and BGL[i−1] represents the last value of the background level BGL.

The determination level calculation section 13 amplifies the background level BGL calculated by expression (1) above, and calculates a knock determination level JL for detection of the presence or absence of knocking by adding an offset to the background level BGL thus calculated. The knock determination level JL is represented by the following expression (2).

$$JL=BGL\times Kth+Vofs \quad (2)$$

where Kth represents a threshold coefficient, and Vofs represents a threshold offset.

First of all, the knocking detection section 14 stores the peak hold value PH, similar to the background level calculation section 12.

Subsequently, the knocking detection section 14 calculates an amount of detected knock Vk from the stored peak hold value PH and the knock determination level JL calculated by expression (2) above, and detects the presence or absence of knocking of the engine. The amount of detected knock Vk is represented by the following expression (3).

$$Vk=PH-JL \quad (3)$$

where when the amount of detected knock Vk is larger than "0" (>0), knocking occurs, whereas when the amount of detected knock Vk is equal to or less than "0" ($\leq 0$), there occurs no knocking.

When the occurrence of knocking is first detected by the knocking detection section 14, the ignition timing compensation section 15 calculates an amount of knock retard $\Delta\Theta R$ for controlling the ignition timing of the spark plug 3 (the ignition timing of the internal combustion engine) in a retard angle manner. The amount of knock retard $\Delta\Theta R$ is represented by the following expression (4).

$$\Delta\Theta R=Vk\div JL\times Kg \quad (4)$$

where Kg represents a reflection coefficient of the amount of retard.

In addition, when the occurrence of knocking is not detected, the ignition timing compensation section 15 sets the amount of knock retard $\Delta\Theta R$ to "0".

Subsequently, the ignition timing compensation section 15 calculates the amount of final knock retard $\Theta R$ based on the amount of knock retard $\Delta\Theta R$. The amount of final knock retard $\Theta R$ is represented by the following expression (5).

$$\Theta R=\Theta R[i-1]+\Delta\Theta R-Ka(t) \quad (5)$$

where Ka(t) represents an advance angle restoration constant, and $\Theta R[i-1]$ represents the last value of the amount of final knock retard $\Theta R$.

Here, when the occurrence of knocking is not detected, the amount of knock retard $\Delta\Theta R$ is set to "0", so the amount of final knock retard $\Theta R$ is decreased at a predetermined speed.

Then, the ignition timing compensation section 15 outputs an ignition signal to the spark plug 3 based on the amount of final knock retard $\Theta R$.

Figure 3:
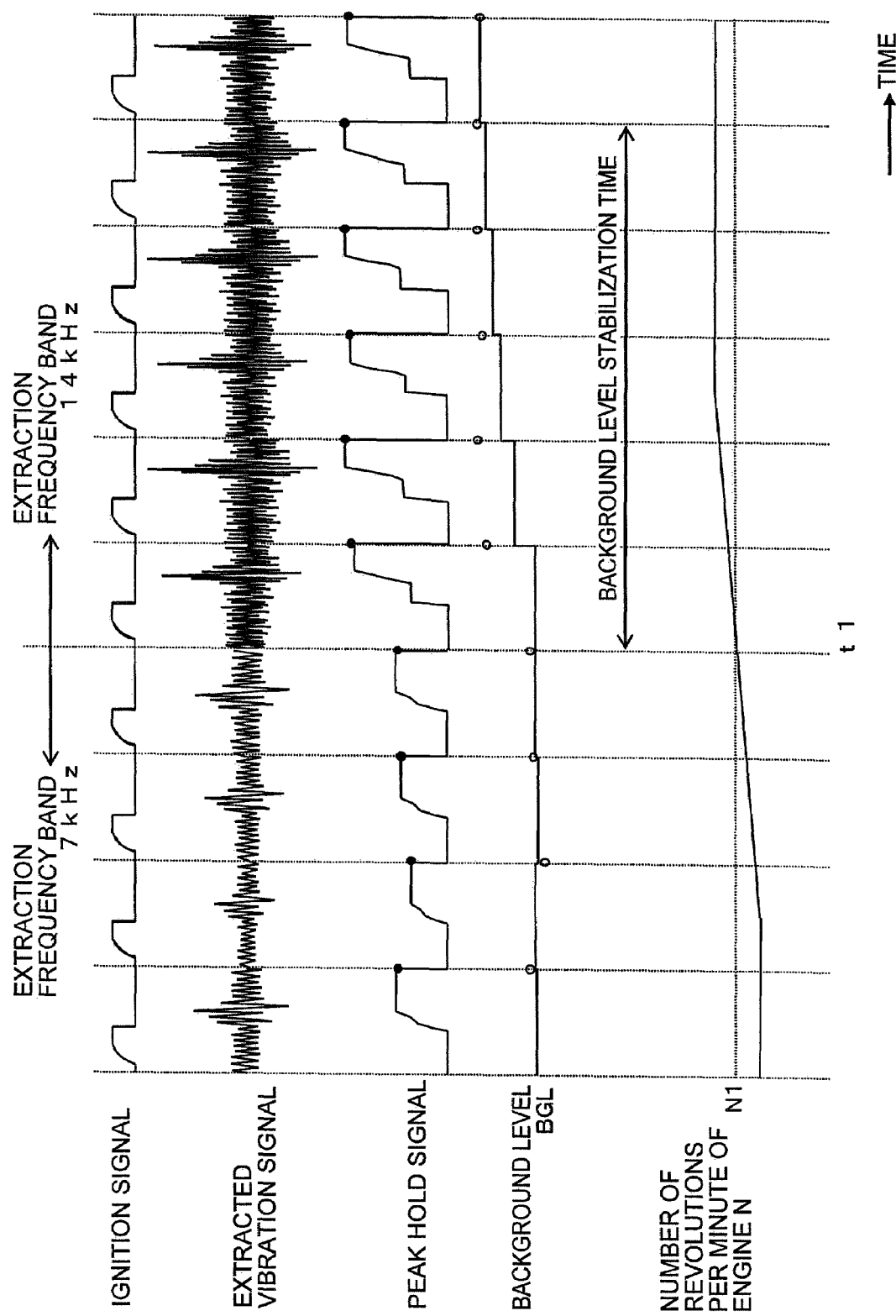
FIG. 3 is a timing chart showing the change of a background level when an extraction frequency band is switched in a general control apparatus for an internal combustion engine.

FIG. 3 is a timing chart that shows the change of the background level BGL when the extraction frequency band is switched in a general control apparatus for an internal combustion engine. FIG. 3 shows the ignition signal to the spark plug 3, the extracted vibration signal from the SCF circuit 6, the peak hold signal from the peak hold circuit 7, the background level BGL calculated from the peak hold value PH, and the number of revolutions per minute N of the engine, respectively.

In FIG. 3, the peak hold signal is reset by a reset signal output at a predetermined timing (see a dotted line) synchronized with the ignition signal, and the holding of a peak value is started again at timing at which the ignition signal is turned off.

Here, note that the peak value (see a filled circle) immediately before the peak hold signal is reset is the peak hold value PH.

Here, the extraction frequency band of the SCF circuit 6 is switched, for example, from 7 kHz to 14 kHz at time point t1 at which the number of revolutions per minute N of the engine becomes higher than a predetermined number of revolutions per minute N1 for switching of the extraction frequency band.

The output level of the extracted vibration signal varies according to the extraction frequency band, so when the extraction frequency band is switched, as shown in FIG. 3, there occurs a delay time (a stabilization time of the background level) until the background level BGL calculated by averaging the peak hold value PH (see an open circle) becomes stabilized. As a result, during the background level stabilization time, the calculation accuracy of the knock determination level JL decreases, thereby reducing the detection accuracy of knocking.

Figure 4:
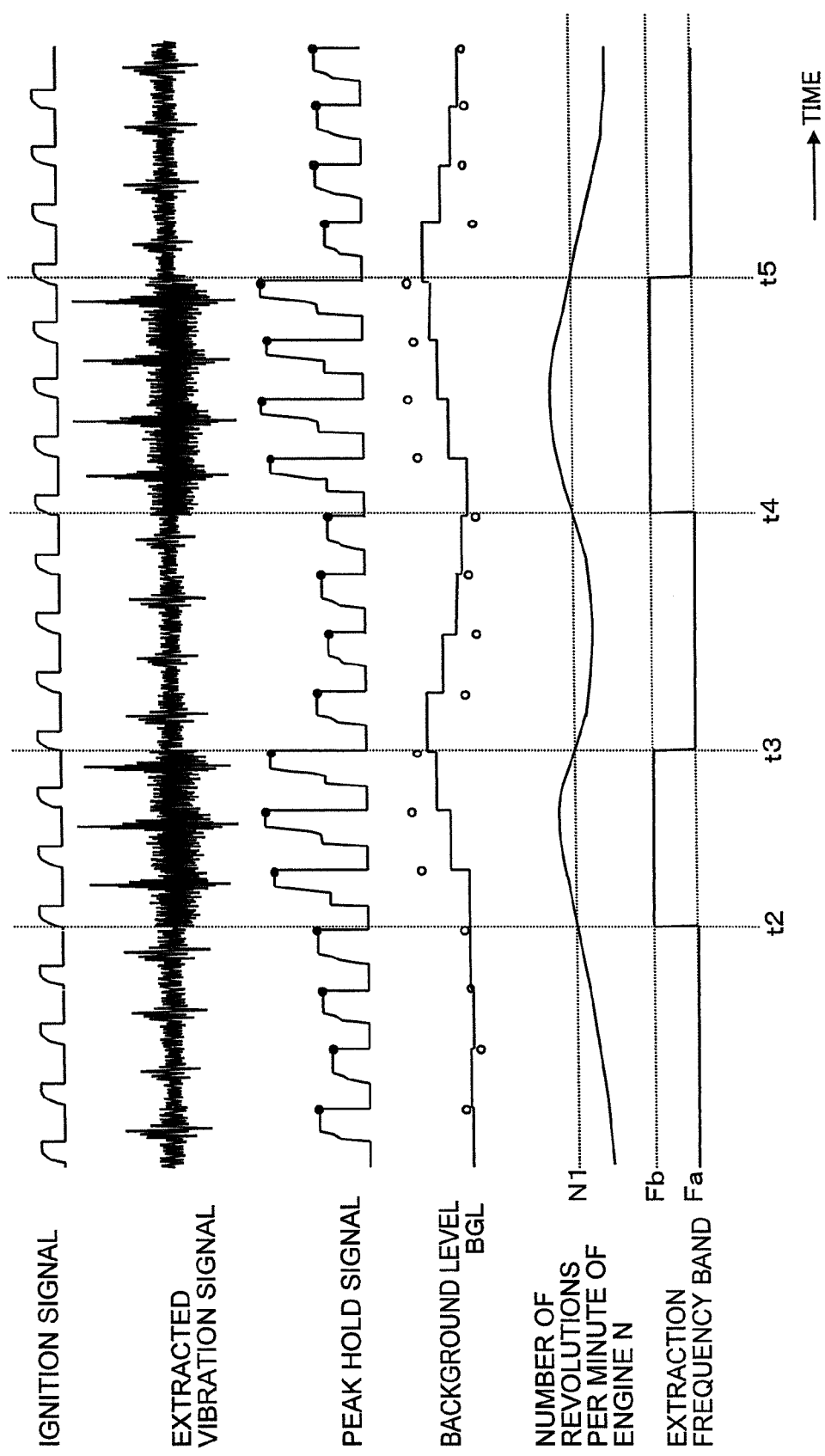
FIG. 4 is a timing chart showing the change of the background level when the number of revolutions per minute of the engine crosses a predetermined number of engine revolutions at short time intervals in the general control apparatus for an internal combustion engine.

FIG. 4 is a timing chart that shows the change of the background level when the number of revolutions per minute N of the engine crosses the predetermined number of engine revolutions N1 at short time intervals in the general control apparatus for an internal combustion engine. FIG. 4 shows the extraction frequency band of the SCF circuit 6 in addition to those in FIG. 3.

In FIG. 4, the extraction frequency band of the SCF circuit 6 is first switched from a frequency band Fa to a frequency band Fb at time point t2 at which the number of revolutions per minute N of the engine becomes higher than the predetermined number of revolutions per minute N1.

Subsequently, the extraction frequency band of the SCF circuit 6 is switched from the frequency band Fb to the frequency band Fa at time point t3 at which the number of revolutions per minute N of the engine becomes lower than the predetermined number of revolutions per minute N1.

Hereinafter, at time points t4, t5, the number of revolutions per minute N of the engine crosses the predetermined number of revolutions per minute N1, and hence the extraction frequency band is switched over in succession.

At this time, the output level of the extracted vibration signal changes in accordance with the switching of the extraction frequency band, so the background level BGL is not stabilized, and the reduced detection accuracy of knocking continues.

Figure 5:
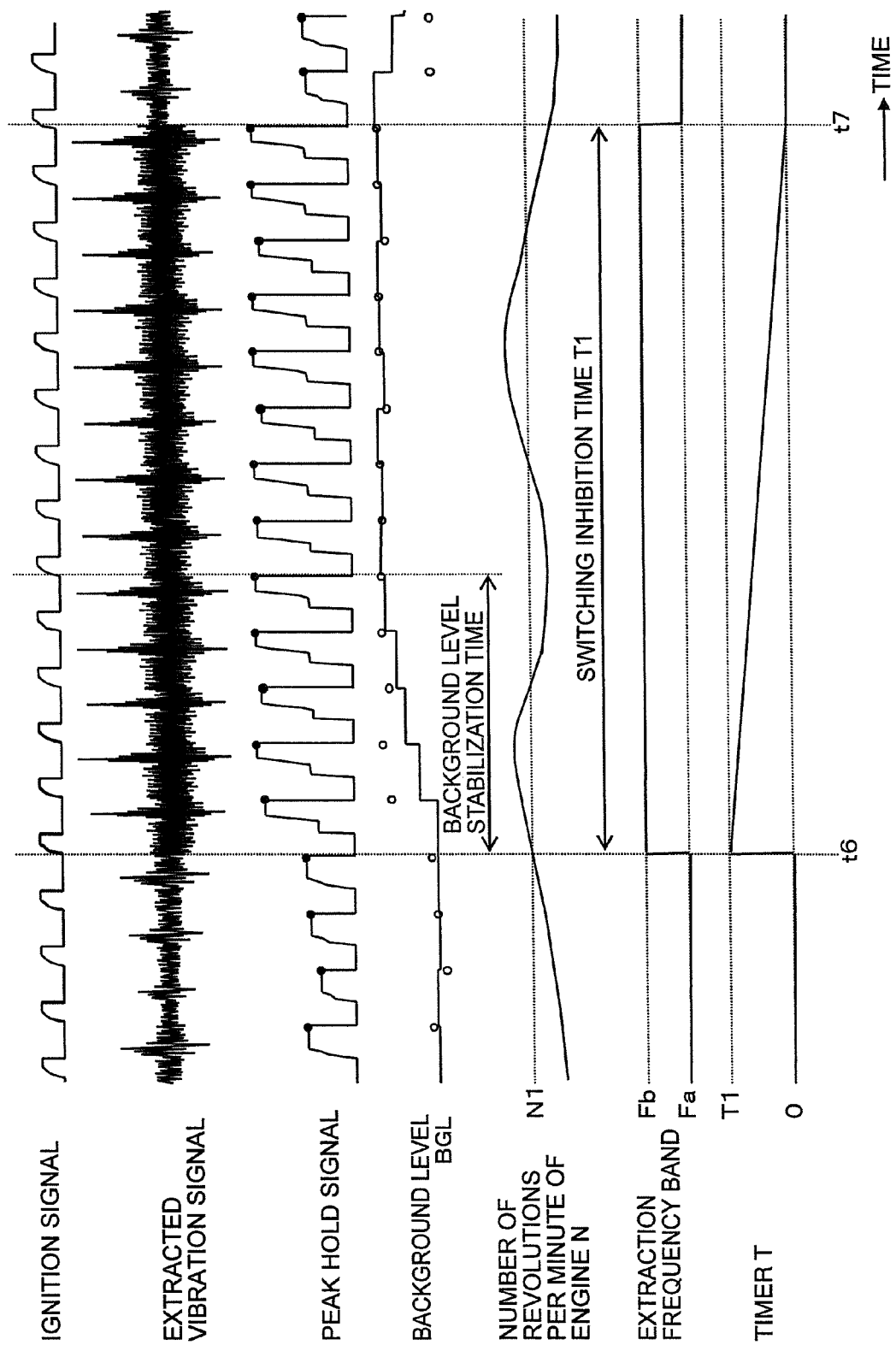
FIG. 5 is a timing chart showing the change of the background level when the number of revolutions per minute of the engine crosses a predetermined number of engine revolutions at short time intervals in the control apparatus for an internal combustion engine according to the first embodiment of the present invention.

FIG. 5 is a timing chart that shows the change of the background level BGL when the number of revolutions per minute N of the engine crosses the predetermined number of engine revolutions N1 at short time intervals in the control apparatus for an internal combustion engine according to the first embodiment of the present invention. FIG. 5 shows, in addition to those in FIG. 4, a timer T that is set by the filter frequency switching section 10 for measuring the time elapsed after switching of the extraction frequency band.

Here, the timer T is subtracted or decremented at a predetermined time interval in accordance with the time elapsed.

In FIG. 5, first of all, at time point t6 at which the number of revolutions per minute N of the engine becomes higher than the predetermined number of revolutions per minute N1, the filter frequency switching section 10 switches the extraction frequency band of the SCF circuit 6 from the frequency band Fa to the frequency band Fb. In addition, the filter frequency switching section 10 activates the timer T in which the switching inhibition time T1 is set, thereby inhibiting the switching of the extraction frequency band for this period of time.

Subsequently, since the number of revolutions per minute N of the engine is lower than the predetermined number of revolutions per minute N1 at time point t7 at which the switching inhibition time T1 has elapsed, the filter frequency switching section 10 switches the extraction frequency band of the SCF circuit 6 from the frequency band Fb to the frequency band Fa.

Accordingly, the extraction frequency band can not be switched over until the switching inhibition period T1 elapses after the switching of the extraction frequency band.

Thus, by preventing the extraction frequency band from being switched over in succession, it is possible to ensure the state in which the background level BGL is stable for a predetermined time after the switching of the extraction frequency band, whereby it is possible to avoid a situation in which the reduced detection accuracy of knocking continues.

Here, note that the switching of the extraction frequency band may be inhibited over a predetermined number of ignitions (a first predetermined period) instead of for the switching inhibition time T1.

Hereinafter, reference will be made to the operation of the filter frequency switching section 10 according to the first embodiment of the present invention while referring to a flow chart in FIG. 6 together with FIGS. 1 through 5.

First of all, the filter frequency switching section 10 calculates the number of revolutions per minute N of the engine based on the period of the pulse signal from the rotation sensor 2 (step S21).

Subsequently, the filter frequency switching section 10 determines whether the timer T for measuring the time elapsed after switching of the extraction frequency band becomes "0". That is, it is determined whether the switching inhibition time T1 has elapsed from the last switching of the extraction frequency band (step S22).

Figure 6:
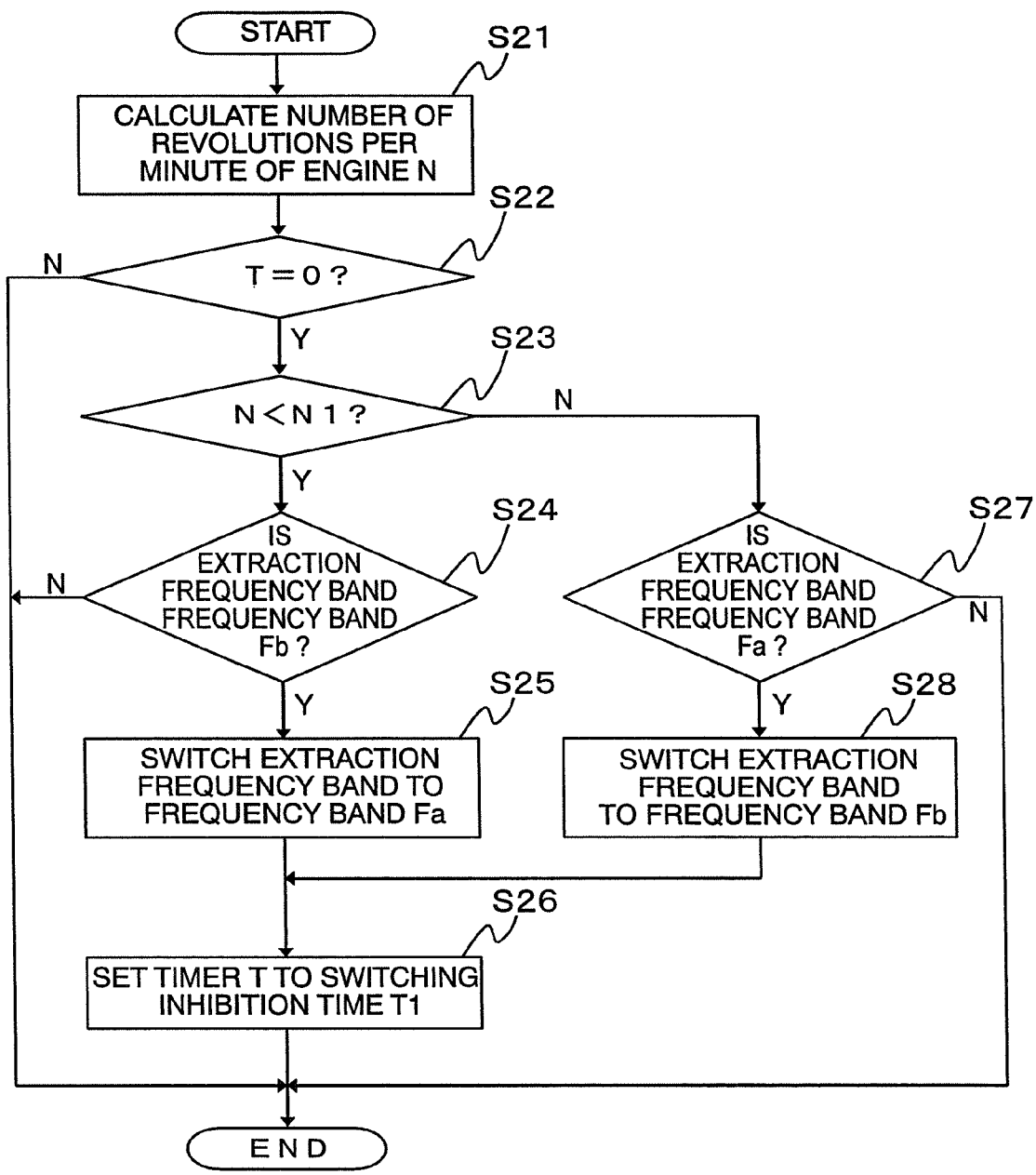
FIG. 6 is a flow chart illustrating the operation of a filter frequency switching part according to the first embodiment of the present invention.

When it is determined in step S22 that the timer T is not "0" (that is, No), it is assumed that the switching inhibition time T1 has not yet elapsed, so the filter frequency switching section 10 terminates the processing of FIG. 6 at once.

Whereas when it is determined in step S22 that the time T is "0" (that is, Yes), the filter frequency switching section 10 assumes that the switching inhibition time T1 has elapsed or it is in an initial state, so it is further determined whether the number of revolutions per minute N of the engine is lower than the predetermined number of revolutions per minute N1 (step S23).

When it is determined in step S23 that the number of revolutions per minute N of the engine is lower than the predetermined number of revolutions per minute N1 (that is, Yes), the filter frequency switching section 10 determines whether the extraction frequency band of the SCF circuit 6 is the frequency band Fb (step S24).

When it is determined in step S24 that the extraction frequency band of the SCF circuit 6 is the frequency band Fb (that is, Yes), the filter frequency switching section 10 switches over the extraction frequency band of the SCF circuit 6 into the frequency band Fa (step S25).

Thereafter, the filter frequency switching section 10 sets the timer T to the switching inhibition time T1 (step S26), and terminates the processing of FIG. 6.

On the other hand, when it is determined in step S24 that the extraction frequency band of the SCF circuit 6 is not the frequency band Fb (that is, No), the filter frequency switching section 10 terminates the processing of FIG. 6 at once.

When it is determined in step S23 that the number of revolutions per minute N of the engine is equal to or higher than the predetermined number of revolutions per minute N1 (that is, No), the filter frequency switching section 10 determines whether the extraction frequency band of the SCF circuit 6 is the frequency band Fa (step S27).

When it is determined in step S27 that the extraction frequency band of the SCF circuit 6 is the frequency band Fa (that is, Yes), the filter frequency switching section 10 switches over the extraction frequency band of the SCF circuit 6 into the frequency band Fb (step S28), and the control flow proceeds to step S26.

Whereas when it is determined in step S27 that the extraction frequency band of the SCF circuit 6 is not the frequency band Fa (that is, No), the filter frequency switching section 10 terminates the processing of FIG. 6.

Although in the above description, the number of switching of the extraction frequency band of the SCF circuit 6 is shown as being one by way of example, the present invention is not limited to this, but the extraction frequency band may be switched over a plurality of times in accordance with the number of revolutions per minute N of the engine.

In addition, although the number of revolutions per minute N of the engine has been used as the operating state of the engine, the present invention is not limited to this, but an amount of charged air, intake pipe pressure or the like indicating a loaded state of the engine may be used.

Next, reference will be made to the switching processing of the extraction frequency band when the operating state of the engine has changed rapidly in the control apparatus for an internal combustion engine as constructed above.

In general, as an operating condition for switching the extraction frequency band, an operation range is set in which knocking controllability of an allowable level can be ensured in individual extraction frequency bands before and after the switching, respectively.

In addition, the more away from the above operating condition the operating state of the engine passes, the greater the amount of reduction in the detection accuracy of knocking becomes in an extraction frequency band before the changing.

Accordingly, it is desirable that when the operating state of the engine has changed rapidly, the extraction frequency band be switched over into an appropriate one at once.

That is, even before the switching inhibition time T1 elapses after the switching of the extraction frequency band, the filter frequency switching section 10 switches over the extraction frequency band of the SCF circuit 6 when the operating state of the engine satisfies a predetermined condition or requirement.

Specifically, the filter frequency switching section 10 calculates an amount of change $\Delta N$ in the number of revolutions per minute N representing the operating state of the engine at each predetermined time (hereinafter referred to as an engine revolution number change rate or amount $\Delta N$), and when the engine revolution number change amount $\Delta N$ is equal to or larger than a predetermined value n1 (i.e., when the predetermined requirement is satisfied), the filter frequency switching section 10 switches over the extraction frequency band of the SCF circuit 6 even before the switching inhibition time T1 elapses. The engine revolution number change amount $\Delta N$ is represented by the following expression (6).

$$\Delta N = |N - N[i-1]| \qquad (6)$$

where N[i−1] represents the value of the number of revolutions per minute N of the engine before the predetermined time.

Figure 7:
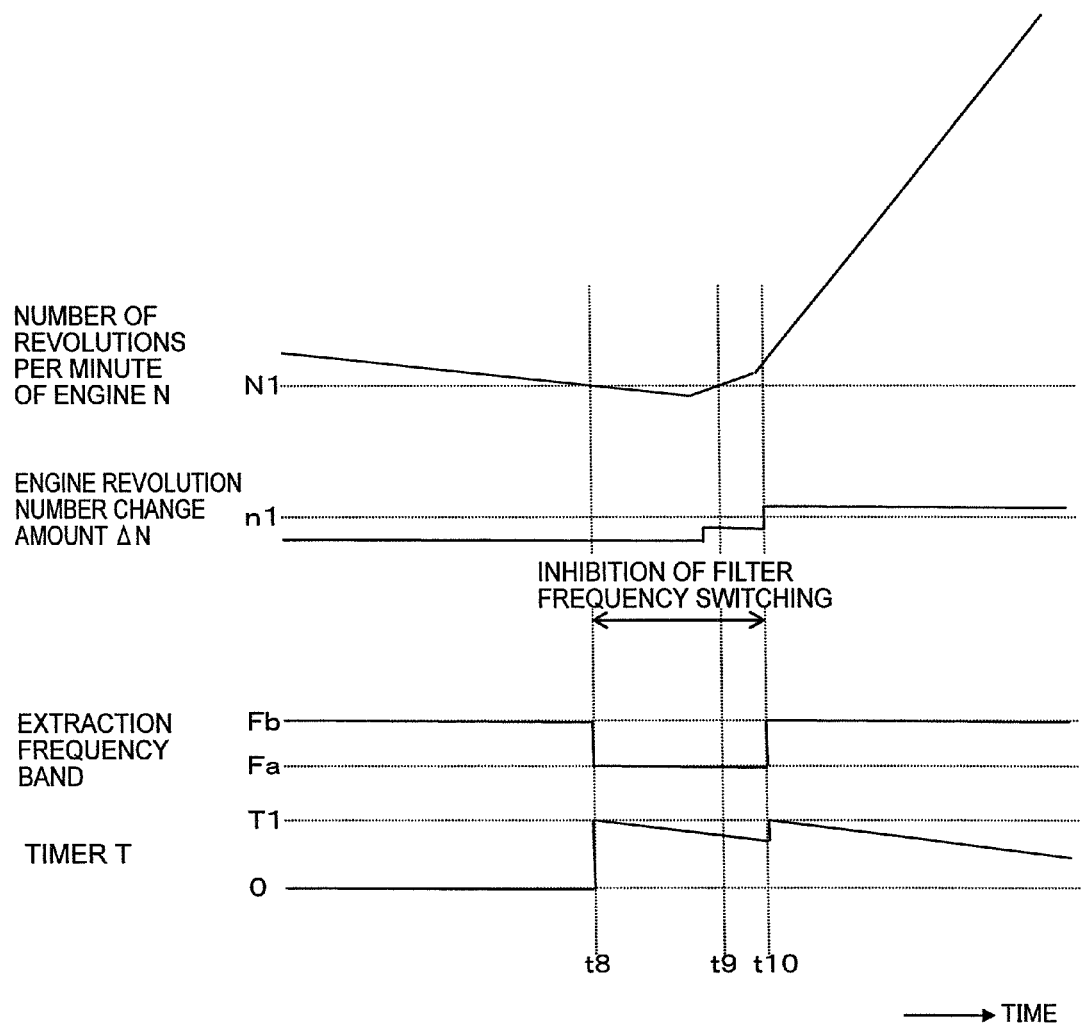
FIG. 7 is a timing chart showing extraction frequency band switching processing when the number of revolutions per minute of the engine changes rapidly in the control apparatus for an internal combustion engine according to the first embodiment of the present invention.

FIG. 7 is a timing chart that shows extraction frequency band switching processing when the number of revolutions per minute N of the engine changes rapidly in the control apparatus for an internal combustion engine according to the first embodiment of the present invention. FIG. 7 shows the number of revolutions per minute N of the engine, the engine revolution number change amount $\Delta N$, the extraction frequency band of the SCF circuit 6, and the timer T for measuring the time elapsed after switching of the extraction frequency band.

In FIG. 7, first of all, at time point t8 at which the number of revolutions per minute N of the engine becomes lower than the predetermined number of revolutions per minute N1, the filter frequency switching section 10 switches the extraction frequency band of the SCF circuit 6 from the frequency band Fb to the frequency band Fa. Also, at this time, the filter frequency switching section 10 activates the timer T in which the switching inhibition time T1 is set, thereby inhibiting the switching of the extraction frequency band for this period of time.

Subsequently, the number of revolutions per minute N of the engine changes to rise, and at time point t9, it becomes higher than the predetermined number of revolutions per minute N1.

At this time, the timer T does not become "0" (the switching inhibition time T1 has not elapsed), and the engine revolution number change amount $\Delta N$ does not become equal to or higher than the predetermined value n1, so the filter frequency switching section 10 does not switch over the extraction frequency band of the SCF circuit 6.

Then, the number of revolutions per minute N of the engine further rises, and at time point t10, the engine revolution number change amount $\Delta N$ becomes equal to or higher than the predetermined value n1.

At this time, the filter frequency switching section 10 assumes that the number of revolutions per minute N of the engine rapidly changes, and hence it switches the extraction frequency band of the SCF circuit 6 from the frequency band Fa to the frequency band Fb before the switching inhibition time T1 elapses. Also, the filter frequency switching section 10 reactivates the timer T in which the switching inhibition time T1 is set.

Accordingly, when the operating state of the engine has changed rapidly, the extraction frequency band can be switched over into an appropriate one at once.

As a result, it is possible to prevent the detection accuracy of knocking from being reduced due to a delay in the switching of the extraction frequency band.

Although in the above explanation, the engine revolution number change amount $\Delta N$ is used as the amount of change of the operating state of the engine, the present invention is not limited to this, but there may instead be used an amount of change such as an amount of charged air, intake pipe pressure, throttle opening or the like representing a loaded state of the engine.

Hereinafter, reference will be made to the operation of the filter frequency switching section 10 according to the first embodiment of the present invention when the number of revolutions per minute N of the engine has rapidly changed while referring to a flow chart in FIG. 8 together with FIGS. 1 through 7.

First of all, the filter frequency switching section 10 calculates the engine revolution number change amount ΔN according to the above-mentioned expression (6) from the number of revolutions per minute N of the engine that is calculated based on the period of the pulse signal from the rotation sensor 2 (step S31).

Subsequently, the filter frequency switching section 10 determines whether the engine revolution number change amount ΔN is equal to or more than the predetermined value n1 (step S32).

Figure 8:
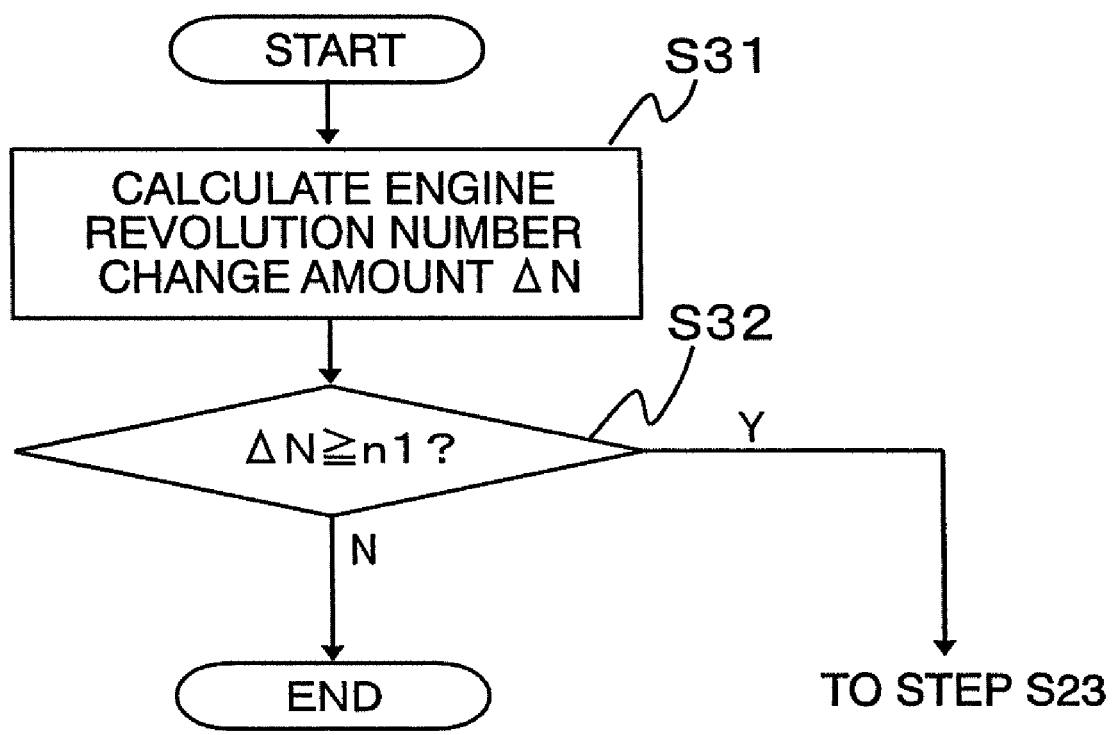
FIG. 8 is a flow chart illustrating the operation of the filter frequency switching part according to the first embodiment of the present invention when the number of revolutions per minute of the engine changes rapidly.

When it is determined in step S32 that the engine revolution number change amount ΔN is equal to or more than the predetermined value n1 (that is, Yes), the control flow shifts to step S23 in FIG. 6, and the processing of FIG. 8 is terminated.

Whereas when it is determined in step S32 that the engine revolution number change amount ΔN is less than the predetermined value n1 (that is, No), the filter frequency switching section 10 terminates the processing of FIG. 8 at once.

According to the control apparatus for an ignition internal combustion engine according to the first embodiment of the present invention, the filter frequency switching section 10 inhibits the switching of the extraction frequency band until the switching inhibition time T1 elapses after switching the extraction frequency band of the SCF circuit 6.

Thus, the extraction frequency band of the SCF circuit 6 is prevented from being switched in succession, whereby it is possible to avoid a situation in which the reduced detection accuracy of knocking after the switching of the extraction frequency band continues.

Accordingly, even when the extraction frequency band of the SCF circuit 6 is switched in accordance with the operating state of the engine, it is possible to detect the presence or absence of knocking of the engine with a high degree of precision.

In addition, even before the switching inhibition time T1 elapses, the filter frequency switching section 10 switches over the extraction frequency band of the SCF circuit 6 when the operating state of the engine satisfies the predetermined condition or requirement.

Thus, when the operating state of the engine has changed rapidly, the extraction frequency band can be switched over into an appropriate one at once, so it is possible to prevent the detection accuracy of knocking from being reduced due to the delay in the switching of the extraction frequency band.

Embodiment 2

The filter frequency switching section 10 according to the first embodiment of the present invention prevents the extraction frequency band from being switched over in succession by inhibiting the switching of the extraction frequency band until the switching inhibition time T1 elapses after switching over the extraction frequency band of the SCF circuit 6, but the present invention is not limited to this.

The filter frequency switching section 10 may compare the operating state of the engine with a predetermined reference value which is a value for switching over the extraction frequency band and which has a hysteresis, and may switch the extraction frequency band of the SCF circuit 6 in accordance with the comparison result.

To this end, there is provided a control apparatus for an internal combustion engine according to a second embodiment of the present invention, of which the configuration or construction is the same as that of the above-mentioned first embodiment, and hence a detailed explanation thereof is omitted.

Specifically, when the number of revolutions per minute N of the engine representing the engine operating state becomes higher than a first predetermined number of revolutions per minute N1 (a first predetermined reference value) for switching over the extraction frequency band, the filter frequency switching section 10 switches the extraction frequency band of the SCF circuit 6 from the frequency band Fa to the frequency band Fb.

On the other hand, when the number of revolutions per minute N of the engine becomes lower than a second predetermined number of revolutions per minute N2 (a second predetermined reference value) which is obtained by subtracting a hysteresis width Nhys from the first predetermined number of revolutions per minute N1, the filter frequency switching section 10 switches the extraction frequency band of the SCF circuit 6 from the frequency band Fb to the frequency band Fa.

Figure 9:
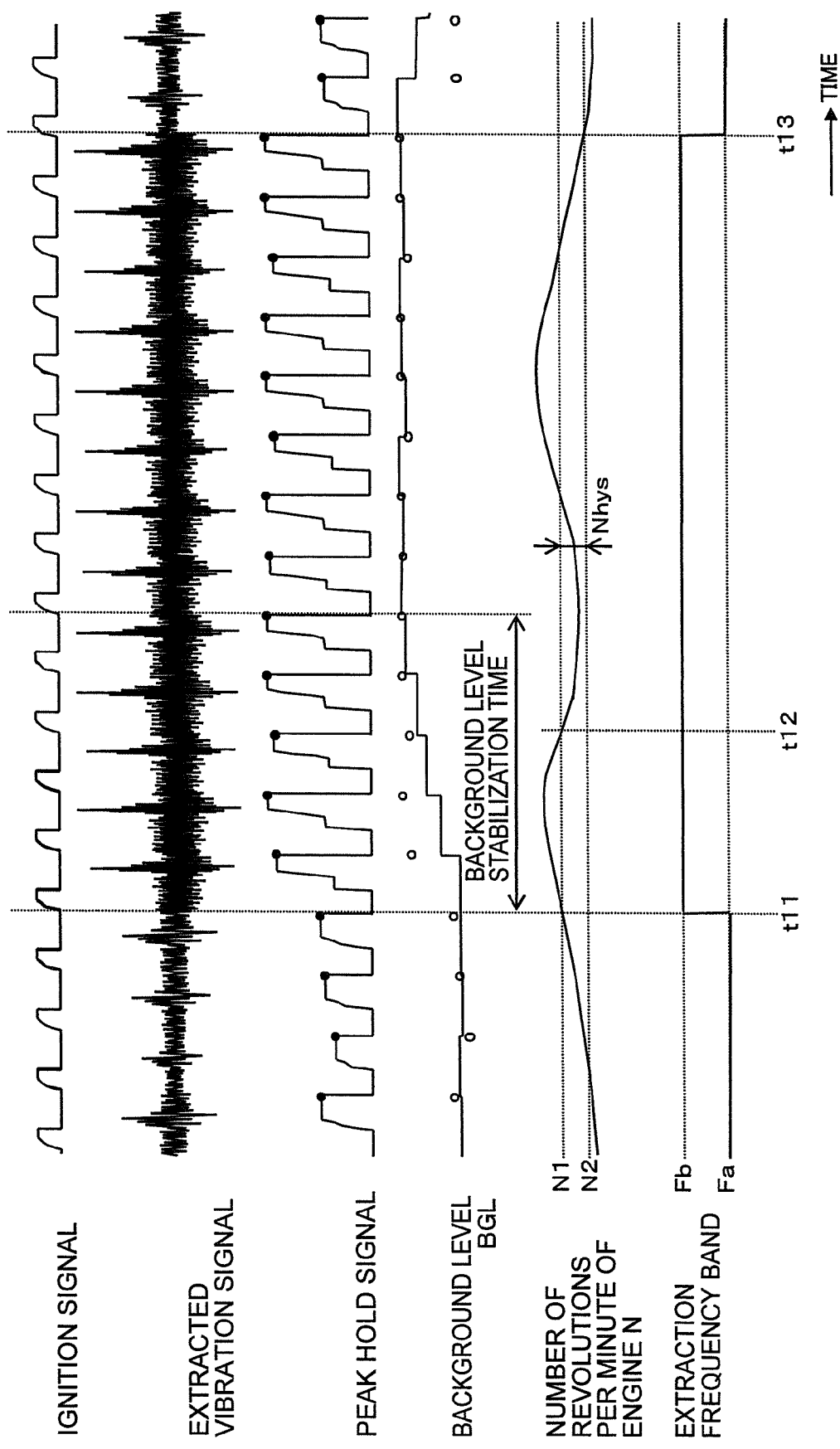
FIG. 9 is a timing chart showing the change of a background level when the number of revolutions per minute of the engine crosses a predetermined number of engine revolutions at short time intervals in a control apparatus for an internal combustion engine according to a second embodiment of the present invention.

FIG. 9 is a timing chart that shows the change of the background level BGL when the number of revolutions per minute N of the engine crosses the first predetermined number of engine revolutions N1 at short time intervals in the control apparatus for an internal combustion engine according to the second embodiment of the present invention. FIG. 9 shows the ignition signal to the spark plug 3, the extracted vibration signal from the SCF circuit 6, the peak hold signal from the peak hold circuit 7, the background level BGL calculated from the peak hold value PH, the number of revolutions per minute N of the engine, and the extraction frequency band of the SCF circuit 6, respectively.

In FIG. 9, first of all, at time point t11 at which the number of revolutions per minute N of the engine becomes higher than the first predetermined number of revolutions per minute N1, the filter frequency switching section 10 switches the extraction frequency band of the SCF circuit 6 from the frequency band Fa to the frequency band Fb.

Subsequently, the number of revolutions per minute N of the engine changes to fall, and at time point t12, it becomes lower than the first predetermined number of revolutions per minute N1.

At this time, the number of revolutions per minute N of the engine does not become lower than the second predetermined number of revolutions per minute N2 (=N1−Nhys), so the filter frequency switching section 10 does not switch over the extraction frequency band of the SCF circuit 6.

Then, at time point t13 at which the number of revolutions per minute N of the engine becomes lower than the second predetermined number of revolutions per minute N2, the filter frequency switching section 10 switches the extraction frequency band of the SCF circuit 6 from the frequency band Fb to the frequency band Fa.

As a result, the extraction frequency band can be prevented from being switched over in succession due to a slight variation in the number of revolutions per minute N of the engine after the switching of the extraction frequency band.

Thus, it is possible to ensure the state in which the background level BGL is stable for a predetermined time after the switching of the extraction frequency band, whereby it is possible to avoid a situation in which the reduced detection accuracy of knocking continues.

Although the number of revolutions per minute N of the engine has been used as the operating state of the engine, the present invention is not limited to this, but an amount of charged air, intake pipe pressure or the like indicating a loaded state of the engine may be used.

In addition, it is considered that the state of occurrence of knocking immediately after the switching of the extraction frequency band of the SCF circuit 6 is substantially equal to the state of occurrence of knocking immediately before the switching of the extraction frequency band. That is, it is considered that an amount of retard of ignition timing as required is substantially the same between immediately after and immediately before the switching of the extraction frequency band.

Accordingly, the ignition timing compensation section 15 holds the amount of retard immediately before the switching of the extraction frequency band until a retard amount holding time T2 (a second predetermined time) elapses after the extraction frequency band is switched.

Here, the retard amount holding time T2 is set, for example, to a background level stabilization time that is required from the switching of the extraction frequency band until the background level BGL is stabilized.

As a result, it is possible to prevent erroneous or improper control on the amount of retard of the ignition timing, which would otherwise result from misdetection of knocking in a situation where after the switching of the extraction frequency band, the background level BGL is not stabilized to reduce knocking detection accuracy. Thus, it is possible to suppress the occurrence of knocking due to advance control of the ignition timing (i.e., reduction in the amount of retard of the ignition timing), which would otherwise be performed by defective detection of knocking.

Here, note that the amount of retard immediately before the switching of the extraction frequency band may be held over a predetermined number of ignitions (a second predetermined period) instead of for the retard amount holding time T2.

Hereinafter, reference will be made to the operation of the filter frequency switching section 10 according to the second embodiment of the present invention while referring to a flow chart in FIG. 10 together with FIGS. 1, 2 and 9.

First of all, the filter frequency switching section 10 calculates the number of revolutions per minute N of the engine based on the period of the pulse signal from the rotation sensor 2 (step 41).

Subsequently, the filter frequency switching section 10 determines whether the number of revolutions per minute N of the engine thus calculated is equal to or higher than the first predetermined number of revolutions per minute N1 (step S42).

When it is determined in step S42 that the number of revolutions per minute N of the engine is equal to or more higher than the first predetermined number of revolutions per minute N1 (that is, Yes), the filter frequency switching section 10 determines whether the extraction frequency band of the SCF circuit 6 is the frequency band Fa (step S43).

When it is determined in step S43 that the extraction frequency band of the SCF circuit 6 is the frequency band Fa (that is, Yes), the filter frequency switching section 10 switches over the extraction frequency band of the SCF circuit 6 into the frequency band Fb (step S44).

Figure 10:
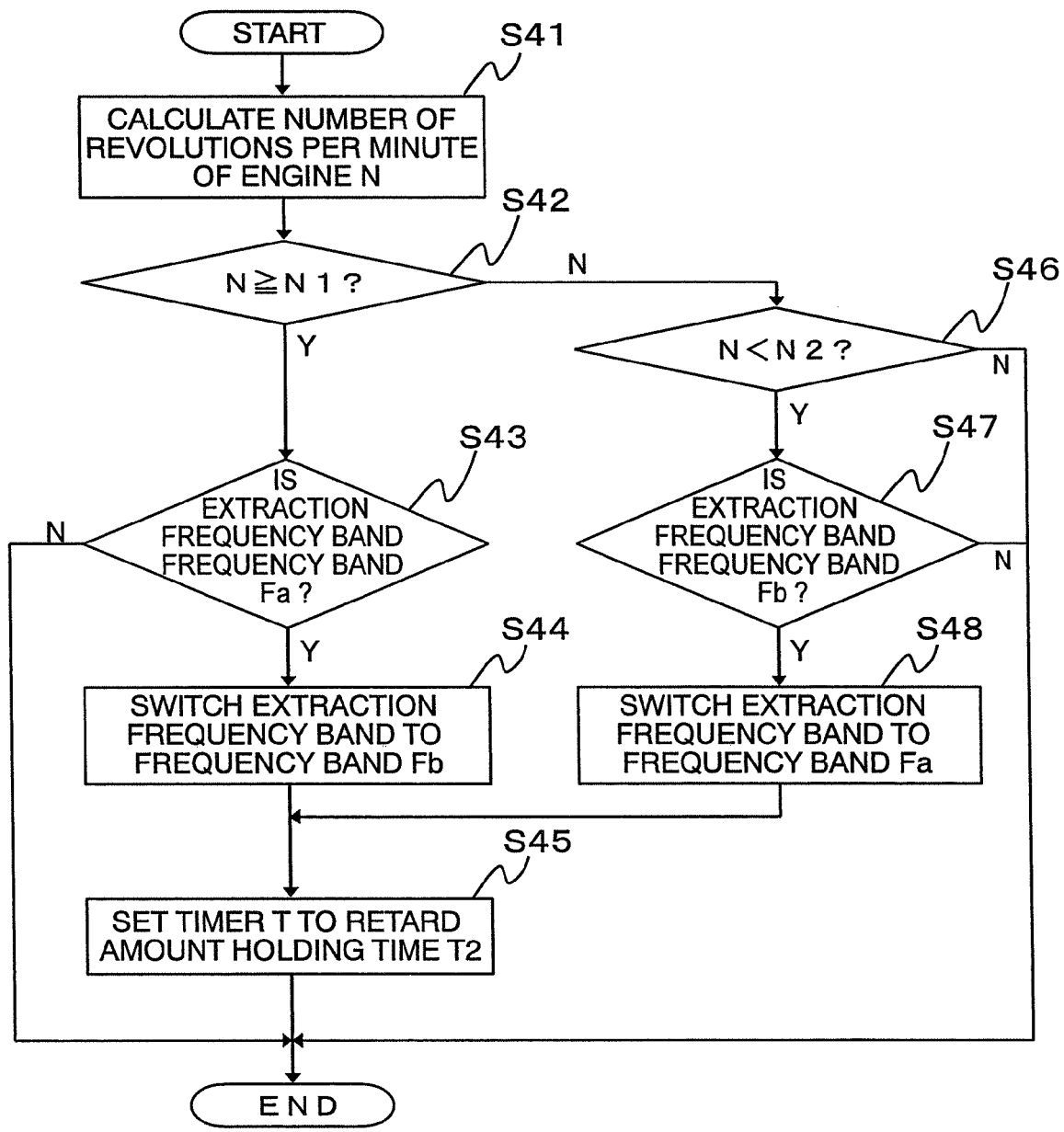
FIG. 10 is a flow chart illustrating the operation of a filter frequency switching part according to the second embodiment of the present invention.

Then, the filter frequency switching section 10 sets the timer T to the retard amount holding time T2 (step S45), and terminates the processing of FIG. 10.

On the other hand, when it is determined in step S43 that the extraction frequency band of the SCF circuit 6 is not the frequency band Fa (that is, No), the filter frequency switching section 10 terminates the processing of FIG. 10 at once.

When it is determined in step S42 that the number of revolutions per minute N of the engine is lower than the first predetermined number of revolutions per minute N1 (that is, No), the filter frequency switching section 10 determines whether the number of revolutions per minute N of the engine is lower than the second predetermined number of revolutions per minute N2 (step S46).

When it is determined in step S46 that the number of revolutions per minute N of the engine is lower than the second predetermined number of revolutions per minute N2 (that is, Yes), the filter frequency switching section 10 determines whether the extraction frequency band of the SCF circuit 6 is the frequency band Fb (step S47).

When it is determined in step S47 that the extraction frequency band of the SCF circuit 6 is the frequency band Fb (that is, Yes), the filter frequency switching section 10 switches over the extraction frequency band of the SCF circuit 6 into the frequency band Fa (step S48), and the control flow proceeds to step S45.

On the other hand, when it is determined in step S46 that the number of revolutions per minute N of the engine is equal to or higher than the second predetermined number of revolutions per minute N2 (that is, No), or when it is determined in step S47 that the extraction frequency band of the SCF circuit 6 is not the frequency band Fb (that is, No), the filter frequency switching section 10 terminates the processing of FIG. 10 at once.

Here, note the timer T is subtracted or decremented at a predetermined time interval in accordance with the time elapsed.

Although in the above description, the number of switching of the extraction frequency band of the SCF circuit 6 is shown as being one by way of example, the present invention is not limited to this, but the extraction frequency band may be switched over a plurality of times in accordance with the number of revolutions per minute N of the engine.

In addition, although the number of revolutions per minute N of the engine has been used as the operating state of the engine, the present invention is not limited to this, but an amount of charged air, intake pipe pressure or the like indicating a loaded state of the engine may be used.

Subsequently, reference will be made to the retard control of ignition timing by means of the ignition timing compensation section 15 according to the second embodiment of the present invention, together with the operation of the microcomputer 8 as a whole, while referring to a flow chart of FIG. 11 together with FIGS. 1 and 2.

First of all, the background level calculation section 12 reads in a peak hold signal A/D converted by the A/D conversion section 11 at each predetermined timing, and stores a peak value of the peak hold signal as a peak hold value PH (step S51).

Subsequently, the background level calculation section 12 calculates a background level BGL according to the above-mentioned expression (1) by averaging the peak hold value PH thus stored.

Then, the determination level calculation section 13 calculates a knock determination level JL according to the above-mentioned expression (2) by amplifying the background level BGL calculated in step S52 and adding an offset thereto (step S53).

Subsequently, the filter frequency switching section 10 determines whether the timer T for measuring the time elapsed after switching over the extraction frequency band becomes "0". That is, it is determined whether the retard amount holding time T2 has elapsed from the last switching of the extraction frequency band (step S54).

When it is determined in step S54 that the timer T is "0" (i.e., the retard amount holding time T2 elapsed or it is in an initial state), the knocking detection section 14 calculates an amount of detected knock Vk according to the above-mentioned expression (3) from the peak hold value PH and the knock determination level JL calculated in step S53 (step S55).

Then, the knocking detection section 14 determines whether the amount of detected knock Vk is larger than "0", i.e., whether knocking has occurred (step S56).

When it is determined in step S56 that the amount of detected knock Vk is larger than "0" (that is, Yes), the ignition timing compensation section 15 assumes that knocking has occurred, and calculates an amount of knock retard $\Delta\Theta R$ for controlling the ignition timing of the spark plug 3 in a retard manner according to the above-mentioned expression (4) (step S57).

Figure 11:
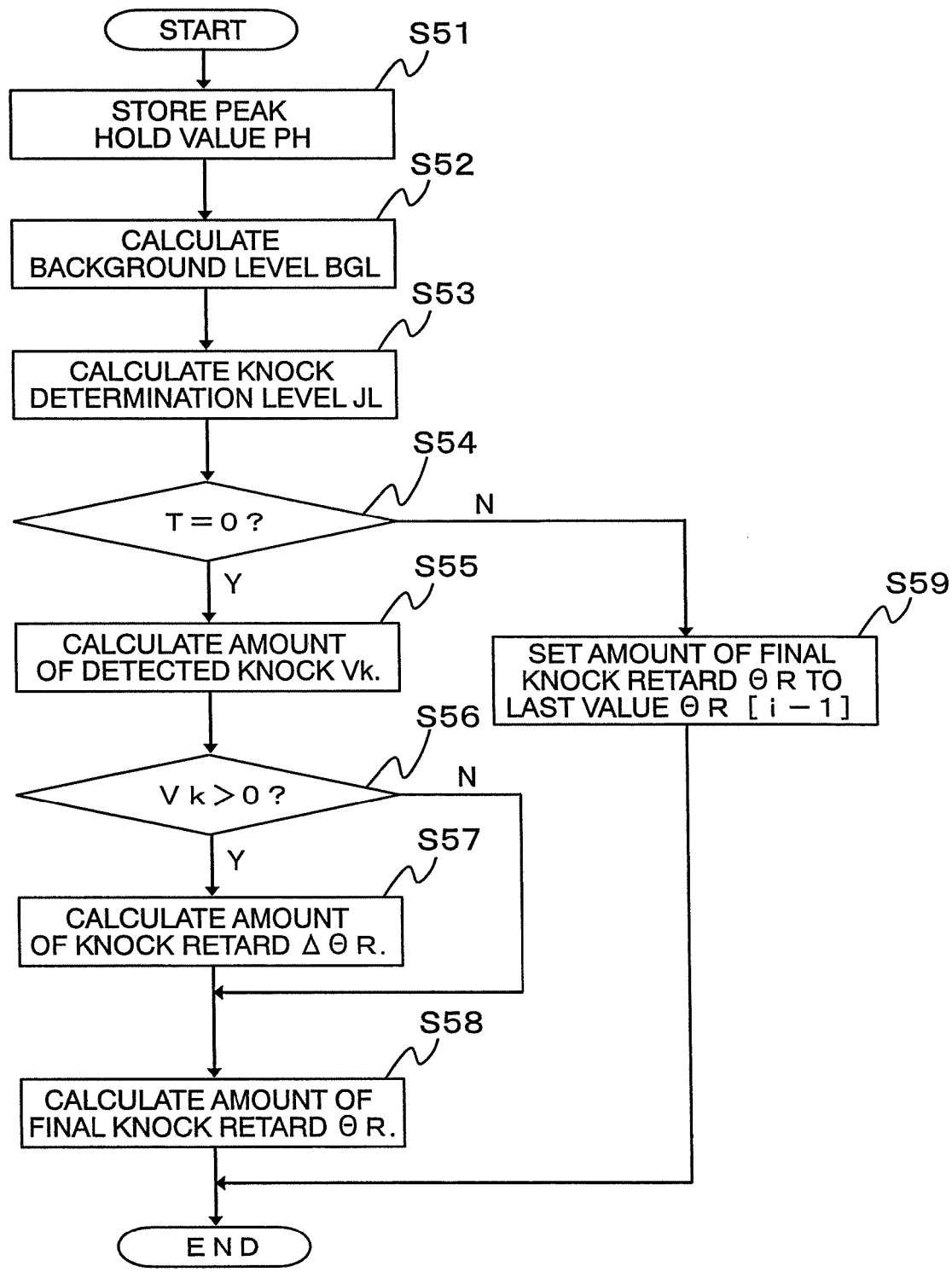
FIG. 11 is a flow chart illustrating retard control on ignition timing by an ignition timing compensation part according to the second embodiment of the present invention.

Subsequently, the ignition timing compensation section 15 calculates an amount of final knock retard $\Theta R$ according to the above-mentioned expression (5) based on the amount of knock retard $\Delta\Theta R$ thus obtained (step S58), and the processing of FIG. 11 is terminated.

On the other hand, when it is determined in step S56 that the amount of detected knock Vk is equal to or less than "0" (that is, No), the ignition timing compensation section 15 assumes that knocking has not occurred, and a shift is made to step S58.

On the other hand, when it is determined in step S54 that the timer T is not "0" (that is, No), the ignition timing compensation section 15 assumes that the retard amount holding time T2 has not elapsed, and sets the amount of final knock retard $\Theta R$ to the last value $\Theta R[i-1]$ (step S59), after which the process of FIG. 11 is terminated.

According to the control apparatus for an internal combustion engine according to the second embodiment of the present invention, when the number of revolutions per minute N of the engine becomes higher than the first predetermined number of revolutions per minute N1, the filter frequency switching section 10 switches the extraction frequency band of the SCF circuit 6 from the frequency band Fa to the frequency band Fb. Also, when the number of revolutions per minute N of the engine becomes lower than the second predetermined number of revolutions per minute N2 which is obtained by subtracting the hysteresis width Nhys from the first predetermined number of revolutions per minute N1, the filter frequency switching section 10 switches the extraction frequency band of the SCF circuit 6 from the frequency band Fb to the frequency band Fa.

Thus, the extraction frequency band of the SCF circuit 6 is prevented from being switched in succession, whereby it is possible to avoid a situation in which the reduced detection accuracy of knocking after the switching of the extraction frequency band continues.

Accordingly, even when the extraction frequency band of the SCF circuit 6 is switched in accordance with the operating state of the engine, it is possible to detect the presence or absence of knocking of the engine with a high degree of precision.

In addition, the ignition timing compensation section 15 holds the amount of retard immediately before the switching of the extraction frequency band of the SCF circuit 6 until the retard amount holding time T2 elapses after the extraction frequency band is switched.

As a result, it is possible to prevent erroneous or improper control on the amount of retard of the ignition timing, which would otherwise result from misdetection of knocking in a situation where after the switching of the extraction frequency band, the background level BGL is not stabilized to reduce knocking detection accuracy. Thus, it is possible to suppress the occurrence of knocking due to advance control of the ignition timing, which would otherwise be performed by defective detection of knocking.

While the invention has been described in terms of preferred embodiments, those skilled in the art will recognize that the invention can be practiced with modifications within the spirit and scope of the appended claims.

What is claimed is:

1. A control apparatus for an internal combustion engine comprising:
    a knock sensor that detects vibrations generated in the internal combustion engine and outputs a vibration detection signal;
    an operating state detection section that detects an operating state of the internal combustion engine;
    a filter section that extracts a signal of a specific frequency band from the vibration detection signal and outputs an extracted vibration signal;
    a filter frequency switching section that switches an extraction frequency band of the filter section in accordance with the engine operating state; and
    a knocking detection section that detects the presence or absence of knocking of the internal combustion engine based on the extracted vibration signal;
    wherein the filter frequency switching section inhibits switching of the extraction frequency band over a first predetermined period after the extraction frequency band is switched over.

2. The control apparatus for an internal combustion engine as set forth in claim 1, wherein
    when the engine operating state satisfies a predetermined requirement, the filter frequency switching section switches the extraction frequency band even before the first predetermined period elapses.

3. The control apparatus for an internal combustion engine as set forth in claim 1, further comprising:
    an ignition timing compensation section that controls ignition timing of the internal combustion engine in a retard manner when the knocking is detected;
    wherein the ignition timing compensation section holds an amount of retard of the ignition timing at an amount of retard thereof immediately before switching of the extraction frequency band over a second predetermined period after the switching of the extraction frequency band.

4. A control apparatus for an internal combustion engine comprising:
    a knock sensor that detects vibrations generated in the internal combustion engine and outputs a vibration detection signal;
    an operating state detection section that detects an operating state of the internal combustion engine;
    a filter section that extracts a signal of a specific frequency band from the vibration detection signal and outputs an extracted vibration signal;

a filter frequency switching section that switches an extraction frequency band of the filter section in accordance with the engine operating state; and a knocking detection section that detects the presence or absence of knocking of the internal combustion engine based on the extracted vibration signal;

wherein the filter frequency switching section compares the engine operating state with predetermined reference values for switching of the extraction frequency band, and the predetermined reference values have hysteresis.

5. The control apparatus for an internal combustion engine as set forth in claim 4, further comprising:

an ignition timing compensation section that controls ignition timing of the internal combustion engine in a retard manner when the knocking is detected;

wherein the ignition timing compensation section holds an amount of retard of the ignition timing at an amount of retard thereof immediately before switching of the extraction frequency band over a second predetermined period after the switching of the extraction frequency band.

* * * * *